(12) United States Patent
Chellapilla et al.

(10) Patent No.: US 7,646,940 B2
(45) Date of Patent: Jan. 12, 2010

(54) ROBUST INDEXING AND RETRIEVAL OF ELECTRONIC INK

(75) Inventors: Kumar H. Chellapilla, Redmond, WA (US); John C. Platt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 739 days.

(21) Appl. No.: 11/397,436

(22) Filed: Apr. 4, 2006

(65) Prior Publication Data

US 2007/0230791 A1     Oct. 4, 2007

(51) Int. Cl.
*G06K 9/60* (2006.01)
(52) U.S. Cl. .......................... 382/305; 707/3
(58) Field of Classification Search ............ 382/186, 382/187, 314, 305; 707/3–6
See application file for complete search history.

(56) References Cited

U.S. PATENT DOCUMENTS

| | | | |
|---|---|---|---|
| 5,561,446 A | | 10/1996 | Montlick |
| 5,617,541 A | * | 4/1997 | Albanese et al. ............. 709/207 |
| 5,710,916 A | * | 1/1998 | Barbara et al. ................. 707/9 |
| 5,832,474 A | | 11/1998 | Lopresti et al. |
| 6,018,591 A | | 1/2000 | Hull et al. |
| 6,091,426 A | * | 7/2000 | Hauck et al. ................. 345/619 |
| 6,389,435 B1 | | 5/2002 | Golovchinsky et al. |
| 6,956,970 B2 | | 10/2005 | Dresevic et al. |
| 7,136,082 B2 | * | 11/2006 | Saund et al. ................. 345/619 |
| 7,283,987 B2 | * | 10/2007 | Cha et al. ........................ 707/2 |
| 2003/0007683 A1 | | 1/2003 | Wang et al. |
| 2003/0046087 A1 | | 3/2003 | Johnston et al. |
| 2003/0053084 A1 | | 3/2003 | Geidl et al. |
| 2004/0252888 A1 | | 12/2004 | Bargeron et al. |
| 2005/0182760 A1 | | 8/2005 | Lee et al. |
| 2005/0222848 A1 | | 10/2005 | Napper et al. |
| 2006/0034516 A1 | | 2/2006 | Hullender et al. |

OTHER PUBLICATIONS

Loia et al., Fuzzy Logic and the Semantic Web: Chapter 3: Capturing Basic Semantics Exploiting RDF-oriented Classification, Feb. 2006, Elsevier, pp. 49-69.*

Haddadnia et al., N-feature neural network human face recognition, Oct. 1, 2004, Image and Vision Computing, vol. 22, pp. 1071-1082.*

(Continued)

*Primary Examiner*—Bhavesh M Mehta
*Assistant Examiner*—Dennis Rosario
(74) *Attorney, Agent, or Firm*—Lee & Hayes, PLLC

(57) ABSTRACT

A unique system and method that facilitates indexing and retrieving electronic ink objects with improved efficiency and accuracy is provided. Handwritten words or characters are mapped to a low dimension through a process of segmentation, stroke classification using a neural network, and projection along directions found using OPCA, for example. The employment of OPCA makes these low dimensional representations robust to handwriting variations or noise. Each handwritten word or set of characters is stored along with neighborhood hyperrectangle that represents word variations. Redundant bit vectors are used to index the hyperrectangles for efficient storage and retrieval. Ink-based queries can be submitted in order to retrieve at least one ink object. To do so, the ink query is processed to determine its query point which is represented by a (query) hyperrectangle. A data store can be searched for any hyperrectangles that match the query hyperrectangle.

18 Claims, 17 Drawing Sheets

OTHER PUBLICATIONS

Globerson et al., Sufficent Dimnesionality Reduction with Irrelevance Statistics, Mar. 2003, The Journal of Machine Learning Research, vol. 3, pp. not numbered and has 8 pages total.*

Sierra, High-order Fisher's discriminant analysis, Jun. 2002, Pattern Recognition, vol. 35, Issue: 6, pp. 1291-1302.*

Hoppner et al., Fuzzy Cluster Analysis, 1999, John Wiley and Sons,pp. 242.*

Zhang et al., Making the Pyramid Technique Robust to Query Types and Workloads, 2004, IEEE Proceedings of the 20th International Conference on Data Engineering, pp. unnumbered:12 pages total.*

Rumelhart. "Theory to Practice: A Case Study Recognizing Cursive Handwriting" (1992) Proceedings of the 3rd NEC Research Symposium on Computational Learning and Cognition, pp. 177-196.

Rowley, et al. "The Effect of Large Training Set Sizes on Online Japanese Kanji and English Cursive Recognizers" (2002) Proceedings of the 8th International Workshop on Frontiers in Handwriting Recognition, pp. 36-40.

Tappert, et al. "The State of the Art in Online Handwriting Recognition" (1990) IEEE Transactions on Pattern Analysis and Machine Intelligence, vol. 12, No. 8, pp. 787-196.

Simard, et al. "Best Practice for Convolutional Neural Networks Applied to Visual Document Analysis" (2003) International Conference on Document Analysis and Recognition, IEEE Computer Science, pp. 958-962.

Hollerbach. "An Oscillation Theory of Handwriting" (1981) Biological Cybernetics, pp. 139-156.

Perrone, et al. "Machine Learning in a Multi-media Document Retrieval Framework" IBM Systems Journal (2002), 13 pages.

Jain, et al. "Indexing and Retrieval of On-line Handwritten Documents" Proceedings of the 7th International Conference on Document Analysis and Recovery (2003) pp. 655-659.

Aref, et al. "The Handwritten Trie: Indexing Electronic Ink" (1995) Proceedings of the 1995 ACM SIGMOD International Conference on Management of Data, pp. 151-162.

Russell, et al. "Handwritten Document Retrieval" Proceedings of the 8th International Workshop on Frontiers in Handwriting Recognition (2002) 6 pages.

Lopresti, et al. "On the Searchability of Electronic Ink" Proceedings of the 4th International Workshop on Frontiers in Handwriting Recognition (1994) pp. 156-165.

Kamel, et al. "Fast Retrieval of Cursive Handwriting" Proceedings of the Fifth International Conference on Information and Knowledge Management, pp. 91-98.(1996).

Kwok, et al. "Ink Retrieval from Handwritten Documents" (2000) Second International Conference on Intelligent Data Engineering and Automated Learning, pp. 461-466.

Hull, et al. "Scribble Matching" (1994) Proceedings of the 4th International Workshop on Frontiers in Handwriting Recognition, pp. 285-295.

Poon, et al. "Scribbler: A Toll for Searching Digital Ink" (1995) CHI 95 Human Factors in Computing Systems Conference, pp. 252-253.

Burges, et al. "Identifying Audio Clips with RARE" (2003) Proceedings of the 11th ACM International Conference on Multimedia, pp. 444-445.

Goldstein, et al. "Redundant Bit Vectors for Quickly Searching High-Deminsional Regions" (2004) Deterministic and Statistical Methods in Machine Learning, pp. 137-158.

Burges, et al. "Distortion Discriminant Analysis for Audio Fingerprinting" (2003) IEEE Trans. on Speech and Audio Processing, vol. 11, No. 3, pp. 165-174.

Collins-Thompson, et al. "Improved String Matching Under Noisy Channel Conditions" (2001) Proceedings of the 10th International Conference on Information and Knowledge Management, pp. 357-364.

Nielsen, et al. "Information Retrieval of Imperfectly Recognized Handwriting" (1993) Bellcore (Bell Communications Research), 8 pages.

El-Nasan, et al. "Ink-Link" (2000) International Conference on Pattern Recognition, pp. 2573-2576.

Grauman, et al. "Fast Contour Matching Using Approximate Earth Mover's Distance" (2004) Computer Vision and Pattern Recognition, pp. 220-227.

Levin, et al. "Assessing the Effectiveness of Pen-based Input Queries" (2003) 26th Annual International ACM SIGIR Conference on Research and Development in Information Retrieval pp. 437-438.

Frohlich, et al. "The Usability of Scribble Matching" (1996) Human Factors in Computing Systems Conference, pp. 189-190.

O'Neil, et al. "Improved Query Performance with Variant Indexes" (1997) Proceedings of the 1997 ACM SIGMOD International Conference, pp. 38-49.

The UNIPEN Project. http://www.unipen.org/ last viewed Jun. 28, 2006, 1 page.

Datar, et al. "Locality-sensitive Hashing Scheme Based on p-stable Distributions" (2004) Proceedings of the 20th Annual Symposium on Computational Geometry, pp. 253-262.

* cited by examiner

~ HANDWRITTEN SAMPLES OF THE WORD "TEXT" FROM THE SAME USER (FROM UNIPEN DATASET)

FIG. 6 ~ DISTORTED VERSIONS OF THE INPUT INK WORD *JOHN*

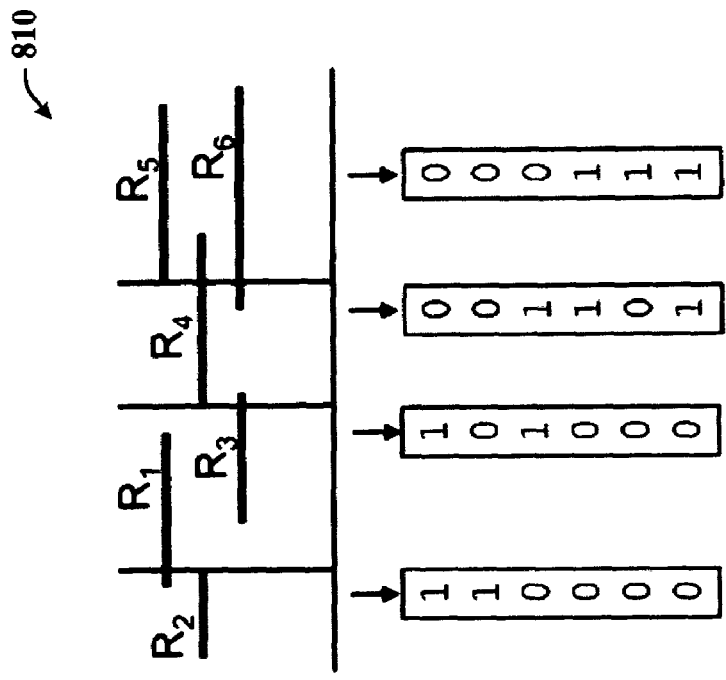
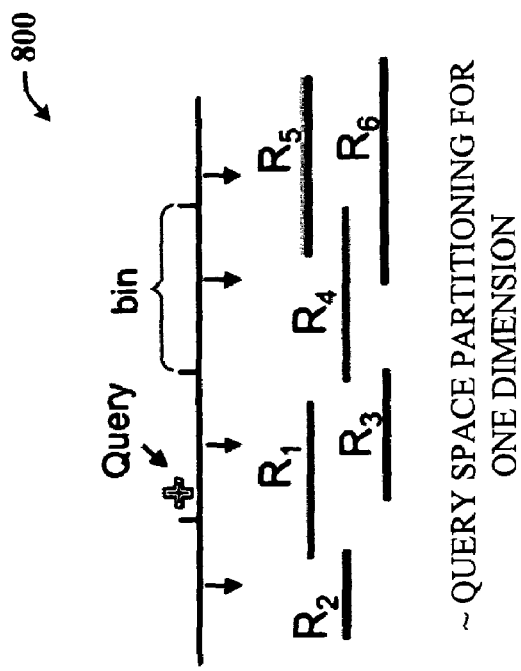
FIG. 8

ROBUST INDEXING AND RETRIEVAL OF ELECTRONIC INK

BACKGROUND

Pen based computers and personal digital assistants (PDAs) offer a more natural means of input and are becoming increasingly common for capturing handwriting, annotation, sketching, and other types of free form input. The growing number of ink documents, both on personal computers and the internet, has created a need for efficient indexing and retrieval of ink documents. Unfortunately, traditional search and retrieval systems lack such capabilities or are too slow and cumbersome for practical anytime use particularly when searching through more than a few hundred ink documents.

Searching in handwritten cursive text is a challenging problem. The same word written by different persons can look very different. Further, multiple instances of the same word written by the same person are similar but not identical. In general, instance variations (for the same person) are smaller than inter-person variations (for the same word), which in turn are smaller than inter-word variations. Thus, to be effective, successful electronic ink retrieval strategies must be robust to such handwriting variations.

Current approaches for ink retrieval fall into three categories: a) recognition based, b) template matching based, or c) shape matching based. Recognition based retrieval methods combine the output of a handwriting recognizer with approximate string matching algorithms to retrieve similar ink. They are quite robust to handwriting styles and generalize well over both print and cursive writing. However, they have high computational requirements as the recognizer needs to be run once on every entry in the data store during indexing. Moreover, during the recognition process much information about the particular shape of the letters (allographs), writing style, etc are lost. Good retrieval rates require that the complete recognition lattice be stored and used during matching which adds significantly to the memory overhead. Furthermore, since handwriting recognition is heavily dependant on the associated lexicon, recognition based retrieval approaches are inherently limited by their accuracy and the applicability of the lexicon used. With a good lexicon, state of the art handwriting recognizers achieve 80-90% word recognition accuracy. However, as soon as the lexicon is removed, word accuracy drops down to 60-70%. In addition, such recognition based retrieval techniques often break down for arbitrary ink input such as pen gestures and line graphics such as flow charts, hand drawn maps, etc.

Unlike other forms of shape data, electronic ink has time information that can be effectively used in template matching algorithms. Dynamic time warp (DTW) is the most prevalent matching technique for producing reliable similarity scores between handwritten words. DTW is very accurate, but is an $O(n^2)$ algorithm, where n is the number of points. As a result, it is computationally prohibitive for use in retrieval applications involving large databases of words. DTW based template matching techniques are well suited for searching through all words in a single page or document and are commonly used for building find-and-replace type of features supported by modern ink capable document editors and word processors.

Shape matching algorithms decompose the input shape into a bag of shape features. Two shapes are compared for similarity based on the minimum cost of matching features from one shape to the features of the other. The lower the matching cost the better the match (with zero as a lower bound). Unlike DTW matching, the shape features typically discard all time information. Unfortunately, as in the case of DTW, computing the optimal matching for a single shape comparison has a complexity that is super-polynomial in the number of features. Thus, shape matching algorithms have been effective over small database sizes but impractical over anything larger than a few hundred words.

All of the above approaches for ink retrieval rely on a linear scan through the database for each query which tends to be slow. Sequential evaluation combined with early termination is commonly employed while computing match scores to avoid long query times.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that provide a new approach for indexing and retrieving handwritten words or symbols captured using an electronic pen or tablet. In particular, handwritten words (cursive or print) are first segmented and featurized using a neural network. The neural network can serve as a classifier to classify the one or more segments. These features are indexed using a hashing scheme that is both locality sensitive as well as robust to input noise. Oriented principal component analysis (OPCA) can be used to map these features into a low dimensional space, thereby facilitating robustness to handwriting variation (noise). Redundant bit vectors are used to index the resulting low dimensional representations for efficient storage and retrieval.

More specifically, an ink word or input ink can be initially normalized and segmented and then can be mapped to a membership matrix using a neural network. The membership matrix can then be projected into a low dimensional space defined by at least a subset of OPCA directions (e.g., first 32 directions). Through this process, each input ink (word) can become a point in the low dimensional space. Distorted versions of the input ink can also be represented as points in the low dimensional space. The combination of computations involving Chebyshev polynomials, classification processing by the neural network, and the directions found using OPCA cause these points for the same word (or input ink) to cluster together closely. The input ink along with its variations can be represented by an enclosing hyperrectangle (or hypersphere). Using OPCA causes these hyperrectangles to be small, thus they can be readily and efficiently stored and/or indexed while the database is built to accommodate subsequent ink search and retrieval.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 8 illustrates query space partitioning and bit vector generation for one dimension as performed in order to index electronic ink using redundant bit vectors.

DETAILED DESCRIPTION

Figure 1:
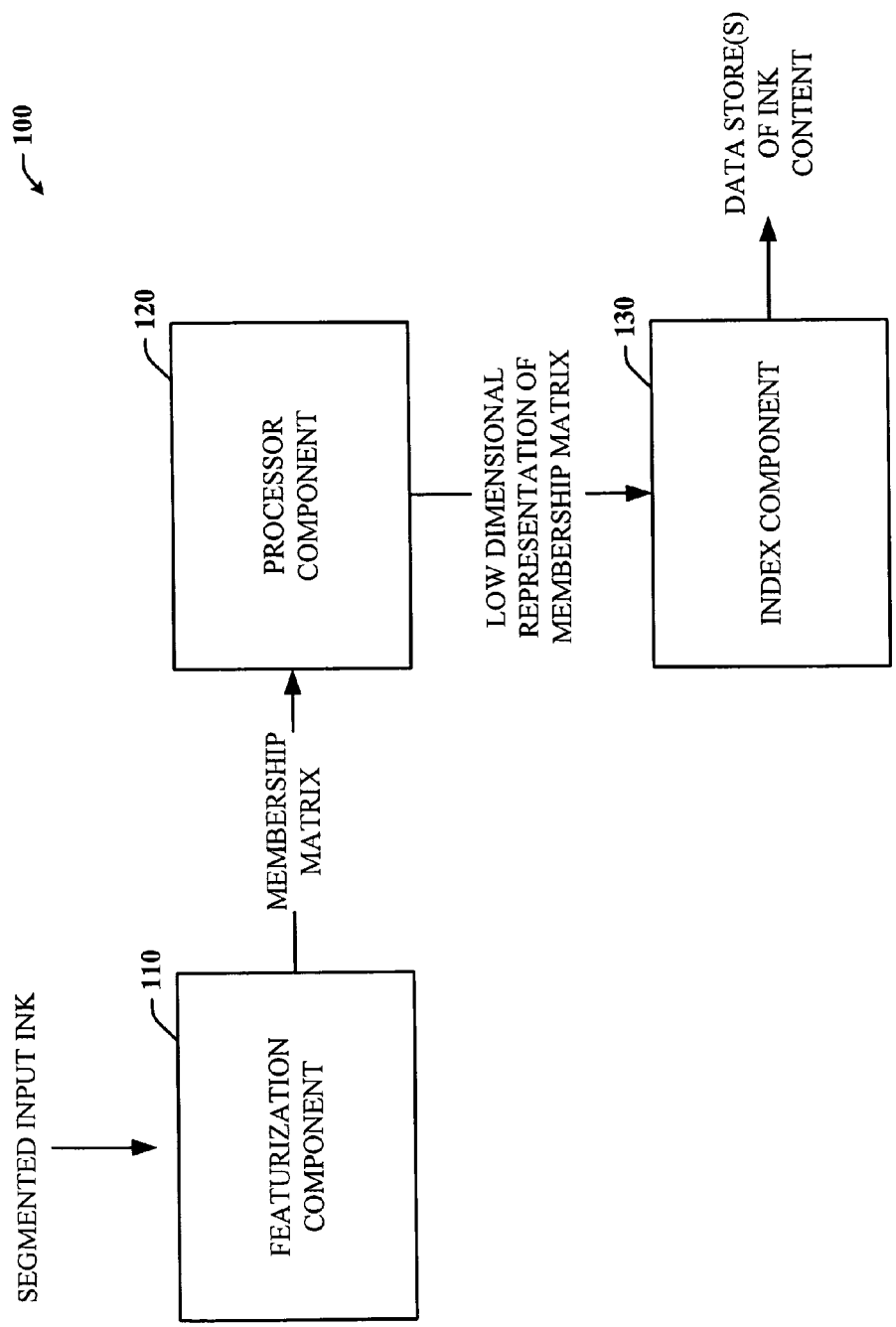
FIG. 1 is a high level block diagram of an indexing system that facilitates more efficient retrieval of ink objects or items.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Unlike previous approaches to ink retrieval, the subject system and method can be effectively employed to search over very large collections of ink documents or objects obtained from hundreds of users with several hundreds of thousands to millions of handwritten words. Query times can be significantly reduced or minimized while achieving high accuracy in the results returned. The subject system and method has been evaluated on a large database containing 898,652 handwritten words. The experimental data will be described later with respect to FIGS. 10-13. In direct contrast, such previous approaches tend to only be effective on relatively small databases of a few hundred words. They may be well-suited for solving find-and-replace type of applications that work with a single ink document but tend to be too slow and are overall ineffective on a larger, more realistic scale.

Referring now to FIG. 1, there is a high level block diagram of an indexing system 100 that can be employed to construct one or more indices for ink content in order to facilitate the retrieval of ink objects such as documents. The system 100 can include a featurization component 110 that featurizes segmented input ink to yield a membership matrix for each input ink. This featurization process can involve segmenting the input ink and computing stroke features for each segment. The featurized segments can then be classified by a neural network in order to reduce or mitigate entropy/variance in the stroke features. The neural network can return stroke or segment membership scores for each segment of the input ink and can learn the stroke memberships. Furthermore, the neural network computations can be used to form a membership matrix for the particular input ink.

The membership matrix can be communicated to a processor component 120 that projects the membership matrix into a low dimensional space. This is performed in order to make the system 100 robust to variations that can occur in the same word written by the same user. The low dimensional space can be defined by projections determined by linear discriminant analysis (LDA) or OPCA, for example.

In addition, a number of distorted versions of the input ink can be created and indexed with the undistorted version. The input ink as well as its distorted counterparts can be represented by hyperrectangles by the indexing component 130 and then stored in one or more indices or a data store. When querying the data store for an ink document (e.g., its hyperrectangle form), a nearest neighbor search can be performed using a brute force linear scan through all stored hyperrectangles to look for any overlap. For large data stores, this scanning process can be relatively slow and impracticable especially if employing a conventional approach. However, the subject indexing component 130 indexes the hyperrectangles using redundant bit vectors which effectively speeds up the nearest neighbor search. A more detail discussion on this can be found below in the following figures.

Figure 2:
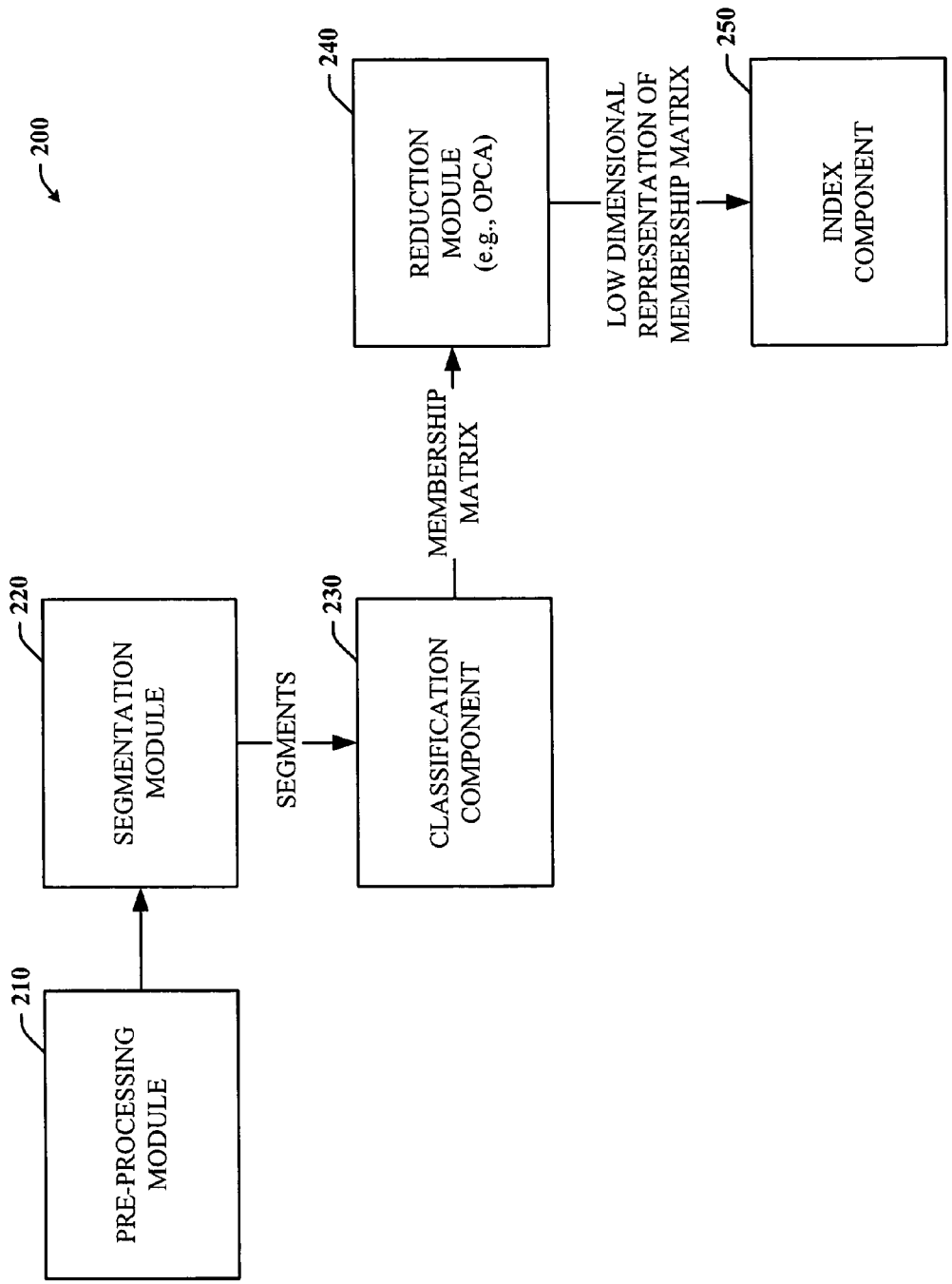
FIG. 2 is a block diagram of an indexing system that facilitates more efficient retrieval of ink objects or items.

Turning now to FIG. 2, there is a block diagram of an indexing system 200 that can be employed to construct one or more indices for electronic ink in order to facilitate the retrieval of such ink. The system 200 includes a pre-processing module 210 that normalizes handwritten input ink. In particular, the pre-processing module 210 can smooth, center and/or scale the input ink to a unit height while preserving its aspect ratio. The normalization process makes ink retrieval immune to translation and scale variations.

Figure 3:
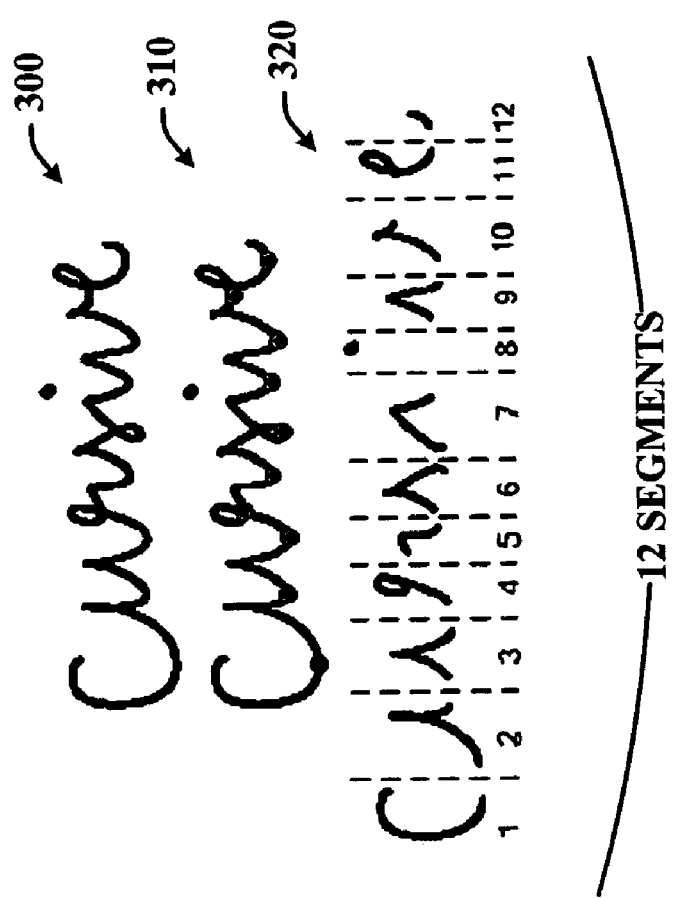
FIG. 3 is a diagram that demonstrates an example of segmentation whereupon the word cursive has been split into 12 segments.

The normalized input ink can then be split into segments by a segmentation module 220. The segmentation module can cut the input ink at the bottoms of the characters. FIG. 3 presents a segmentation example of the word cursive 300—which has been written in cursive in two strokes (one for the word and one for the dot). Segmentation takes place where the y coordinate reaches a minimum value and starts to increase (culling points are noted as the dots in 310). The segments 320 are then sorted by the x-coordinate of their left most point. Each of the segments 320 can then be represented in the form of a Chebyshev polynomial. The coefficients of the truncated Chebyshev polynomial become the segment features. The segment features are invertible and can be used to reconstruct approximate versions of the source segments.

Referring again to FIG. 2, the featurized segments can then be processed or classified by a classification component 230. The classification component 230 can employ a neural network—such as a time delay neural network (TDNN)—to produce segment membership scores for each segment. Using the shape of the segment, one can determine the probability of the segment belonging to each possible character in the language. These probabilities are captured by the segment membership scores. For example, segment 3 in FIG. 3 can belong to any of the following characters: i, u, w, a, etc. The neural network examines each segment and returns a vector of character membership scores.

The character membership vector has two entries for each supported character: one to identify the beginning of a character (begin-membership); and the other to mark the continuation of the character (continuation-membership). For example, segment 3 in FIG. 3 would have a high continuation-membership score for the letter a and a low begin-membership. The TDNN takes three consecutive segments as input and outputs the segment membership scores for the middle segment. The previous and next segments are included to provide context that helps in reducing ambiguity. For the first and last segments, zero inputs are used in place of the missing previous and next segments, respectively. Having two membership entries for each character and providing stroke context as input makes it easier for the TDNN to learn stroke memberships.

The TDNN outputs are collected as consecutive columns to form the membership matrix. The membership matrix is normalized (to have the same size for all words) by padding with zero columns to the right. Each character produces a few segments and each segment has only a few non-zero membership entries. As a result, though the membership matrix appears large, it is typically very sparse with the number of non-zero entries being a small multiple of the number of characters in the word. Note that a membership matrix can be computed in a number of ways: a different classifier can be substituted for the TDNN; or the rows of the matrix can correspond to allographs, rather than characters; or the columns can represent spatial regions rather than segments.

Figure 4:
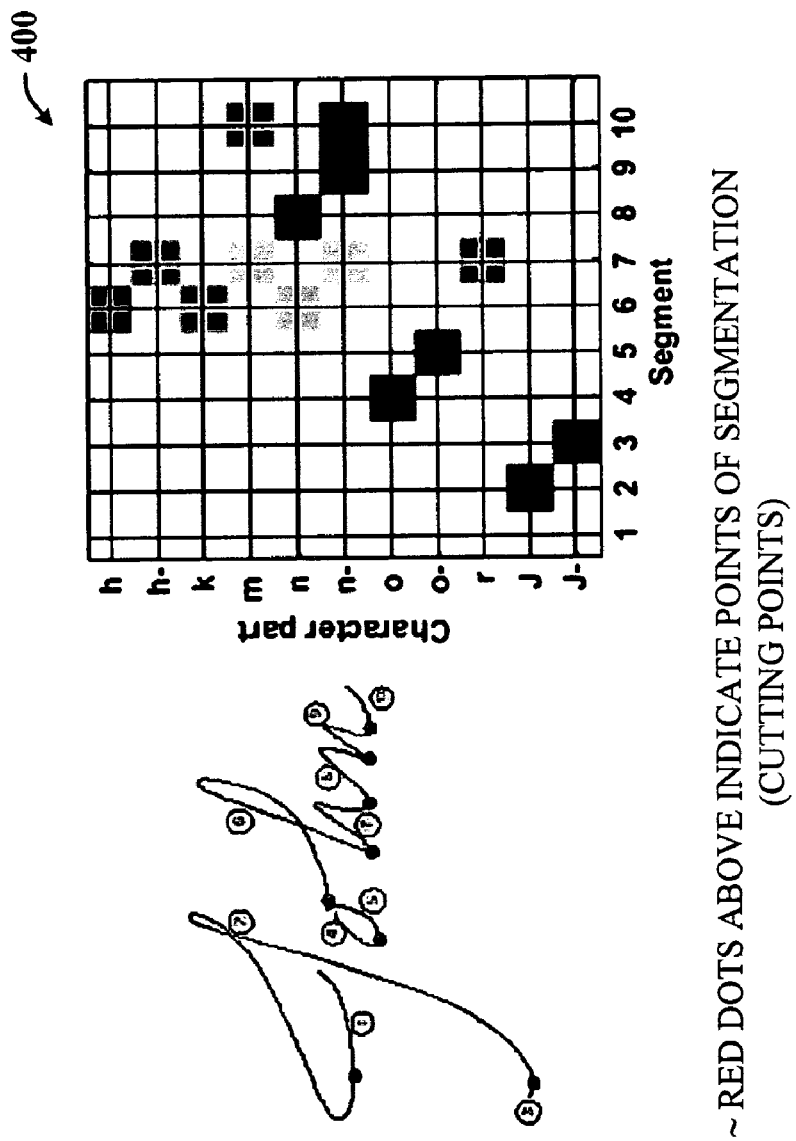
FIG. 4 is a diagram of an exemplary membership matrix for the ink word John.

FIG. 4 displays the membership matrix 400 for a sample ink word John with the all-zero rows and columns omitted. The first segment is clearly rejected (all memberships are zero). Though the segments for J, o, and n are quite unambiguous, the segments for h show non-zero membership values for h, k, m, n, and r, as expected. The segment classification step significantly reduces the entropy present in the stroke features. This type of TDNN is very commonly used as a front end in handwriting recognition systems for stroke featurization. It is trained using back-propagation and word labels. It is important to note that for indexing ink, a high stroke recognition rate is not necessary since the purpose of the TDNN is the reduction of entropy in the stroke features. Even a poor recognizer can be sufficiently useful for indexing.

Figure 5:
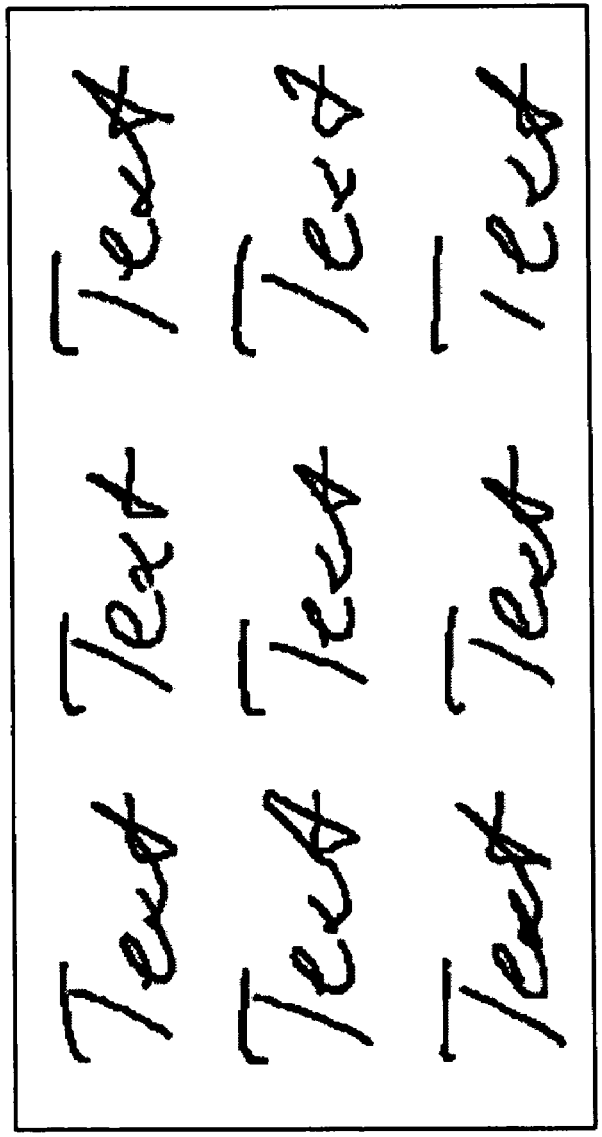
FIG. 5 is a diagram of ink samples of the input ink word Text written by the same user.

Handwritten electronic ink presents a challenge to many retrieval systems because of the variations that can occur in the writing of the same word, character, or symbol by the same user. In FIG. 5, multiple instances of the same word Text have been written by the same user. As can be seen, the instances are similar but not identical. Unlike traditional ink retrieval systems, the subject system 200 in FIG. 2 can be robust to such variations in part through its employment of a reduction component 240.

Figure 6:
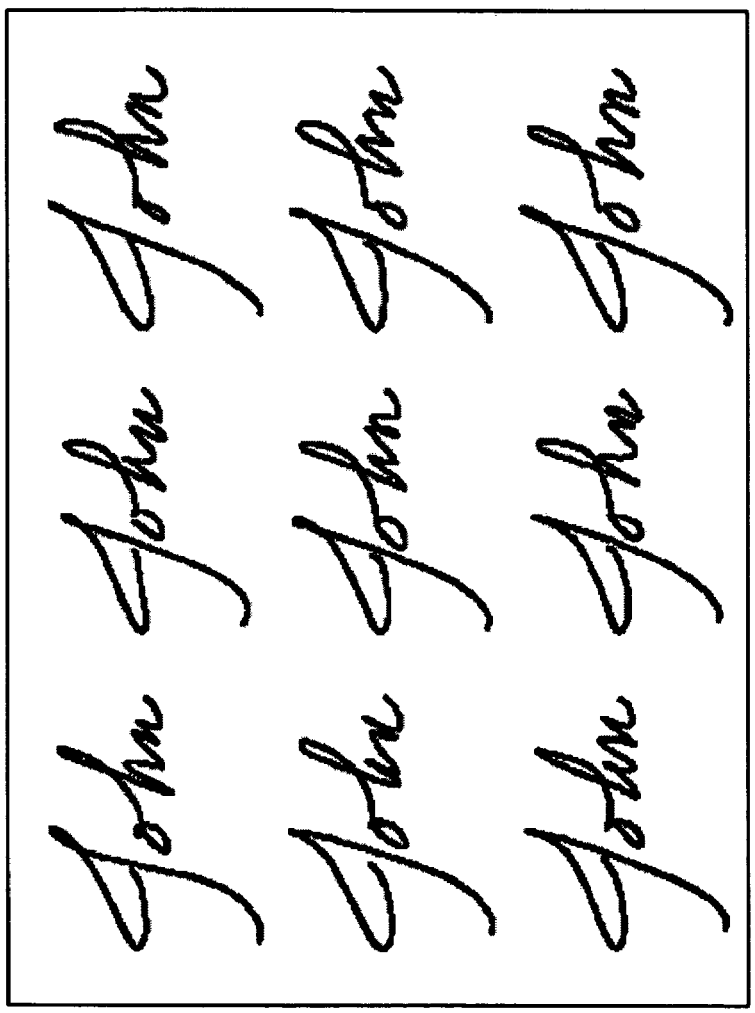
FIG. 6 is a diagram-of distorted ink samples for the input ink word John.

Initially, an ink distortion model is used to generate a large number of distorted copies (typically 100) for each word during indexing. A sequence of noise samples from a two dimensional Gaussian random variable is low pass filtered to generate the distortion field. Low pass filtering is achieved by convolving the noise sequence with a standard Gaussian. FIG. 6 shows some distorted samples produced using this approach. A low distortion level was used. The noise magnitude was arbitrarily chosen to be $1/500^{th}=0.2\%$ of the vertical span of the word (word height). This corresponds to a standard deviation of 0.002 with the input ink being normalized to have unit height. A better approach may be to estimate and use the actual variance present in multiple word instances (e.g., FIG. 5). These variances are likely to vary from word to word and also individual to individual, so the selection of noise parameters should be performed with care.

Membership matrices can be created for the distorted versions of the input ink. The membership matrices for the undistorted input ink and its distorted versions can be projected into a low dimensional space defined by projection directions determined by OPCA by way of the reduction component 240. OPCA can be used to find projection directions for the membership matrix that maximize signal variance and minimize noise variance. The first few projections with the largest eigenvalues capture most of the variance and can be used to build a low dimensional representation of the membership matrix that is well suited for indexing.

In particular, suppose there are given a set of vectors $x_i \in R^d$, i=1, ..., m, where each $x_i$ represents a signal (undistorted samples). Suppose that each $x_i$ has a set of N distorted versions $x_i^k$, k=1, ..., N. For indexing ink, the $x_i$ and $x_i^k$ are membership matrices for undistorted ink words and their distorted versions. It should be appreciated that the membership matrix can be converted into a vector by sequentially concatenating its columns from left to right.

Let $z_i^k$ be the corresponding noise vectors, defined by $z_i^k = x_i^k - x_i$. OPCA tries to find linear projections which are as orthogonal as possible to the $z_i^k$ for all k, but along which the variance of the original signal $x_i$ is simultaneously maximized. The OPCA directions are defined as directions (u) that maximize the generalized Rayleigh quotient $$q = \frac{u' \sum_x u}{u' \sum_z u} \quad (1)$$

where $\Sigma_x$ and $\Sigma_z$ are the covariance matrices for the signal and noise vectors. This modified version uses correlation matrices rather than covariance matrices, since the mean noise signal as well as its variance should be penalized. Explicitly, $\Sigma_x$ and $\Sigma_z$ can be computed using $$\sum_x = \frac{1}{m} \sum_i (x_i - E[x])(x_i - E[x])' \quad (2)$$

$$\sum_z = \frac{1}{mN} \sum_{i,k} (z_i^k)(z_i^k)' \quad (3)$$

Figure 7:
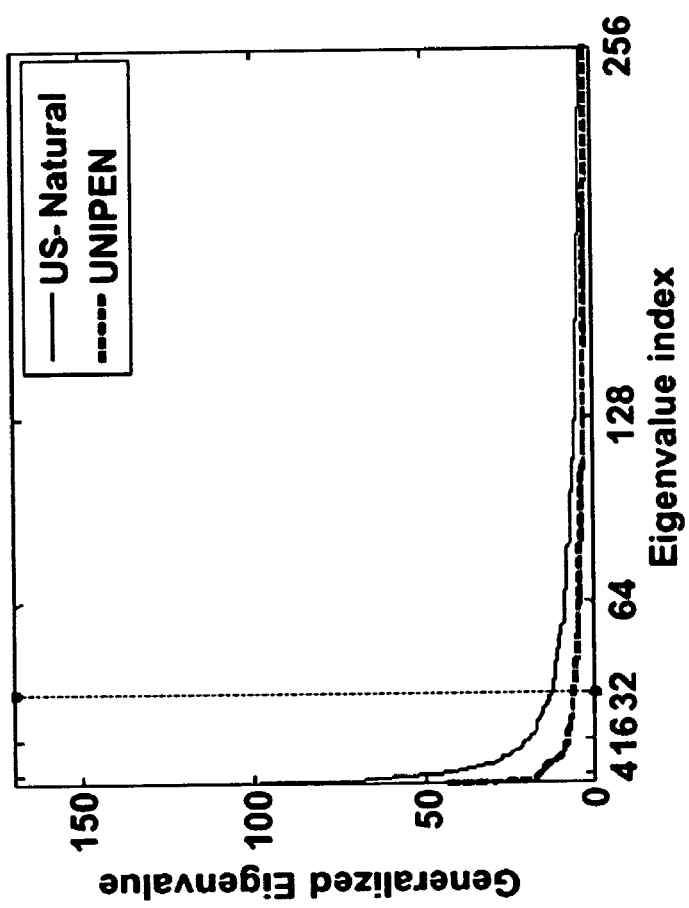
FIG. 7 is a graphical representation of a generalized eigenvalue spread over OPCA projections.

The optimal directions u can be found by solving the generalized eigenvalue problem $$\Sigma_x u = q \Sigma_z u \quad (4)$$

to obtain $(u_i, q_i)$=(eigenvector, eigenvalue) pairs. Most standard numerical linear algebra packages can solve such generalized eigenvalue problems. As in principal component analysis (PCA), one can find a low dimensional representation by selecting the first few (say p) eigenvectors with the largest eigenvalues for projection. FIG. 7 presents example eigenvalue spreads for ink data from two datasets that were used in experiments. Unlike PCA, the directions found using OPCA are not necessarily orthogonal. However, similar words that have similar membership matrices will have similar projected vectors. Similarity here implies a small Euclidean ($L_2$) distance between the vectors. Mathematically, the projected representation of membership matrices is given by $$y_i = u'_i x, i=1, \ldots, p \quad (5)$$

where the $x_i$ are column vector representations of membership matrices (signal vectors). For indexing ink, the experimental data indicated that the first 32 OPCA directions (e.g., p=32) are sufficient (see FIG. 7). However, it should be appreciated that the number of directions employed can be greater or less than 32.

Moreover, each input ink (e.g., handwritten word) becomes a point in the low dimensional space through this process. In the low dimensional space, each input ink, $\{wi\}$, i=1, . . . , M is stored using its hyperrectangle $\{y_i, \epsilon_i\}$, i=1, . . ., M, where $y_i$ and $\epsilon_i$ are vectors of length p and represent the center and side lengths of the hyperrectangle. M is the number of words in the data store. An index component 250 as shown in FIG. 2 can index the hyperrectangles for each input ink using redundant bit vectors.

Redundant bit vectors are very useful for quickly solving spatial object intersection problems that are often encountered in search. For storage purposes, the p-dimensional projections of membership matrices are considered low dimensional. However, for spatial searches, something as low as 30 dimensions is considered large. A large dimension for spatial searches implies that one can replace the hyperspheres typically used for proximity matching to hyperrectangles. Search computations using hyperrectangles are much more amenable to indexing and optimization. In view of this, hyperrectangles rather than hyperspheres can be indexed.

When searching for an ink document or object, the relevant index or data store can be searched. Consider a query word, $w_q$, with a projected vector $y_q \in R^p$. The search problem can be defined as follows:

Search Problem: find all of the words in $\{w_i\}$ that are similar to $w_q$. $w_q$ is defined to be similar to $w_i$ if $y_q$ falls within the hyperrectangle defined by $\{y_i, \epsilon_i\}$.

This spatial search can be solved by using a brute force linear scan through all stored hyperrectangles and checking for overlap. For large databases, such a linear scan can be very slow. However, the lookup process speed can be increased by solving an approximate version of the spatial object intersection using redundant bit vectors. The approximate version of the problem allows a small fraction of false positives and false negatives.

In particular, redundant bit vectors use redundancy to group queries together and are particularly suited to high dimensional point queries over hyperrectangles. The redundancy strategy is based on partitioning the query space rather than the data space.

Consider one of the dimensions in the hyperrectangle space. Each of the hyperrectangles spans an interval along this dimension as shown in FIG. 8 (800). The query space corresponds to the whole x-axis. The query space is partitioned into b intervals, each corresponding to a bin. It should be understood that these intervals do not have to be uniform. Redundant bit vectors treat all queries within one bin identically. This identical treatment does not introduce many false positives, because nearby queries overlap the same rectangles. The redundant bit vectors form an index of the stored hyperrectangles: this index contains pre-computed information of which rectangle overlaps which bin. For each bin, this index is refered to as a "bit-dimension."

FIG. 8 (800) shows six hyperrectangles ($R_1$-$R_6$) along a query dimension that is partitioned into four bins. The first (left-most) and last (right-most) bins extend all the way to $-\infty$, and $+\infty$, respectively. Any query point will fall in one of these intervals. The number of intervals in each dimension, b, was arbitrarily chosen to be 32 for this example. These intervals are typically chosen based on the distribution of the hyperrectangles along that dimension. A heuristic can be used that attempts to evenly spread the selectivity among the b intervals (e.g., over the bit-dimensions). Using this process, each of the p query dimensions are partitioned into b intervals resulting in pb bit-dimensions.

Each hyperrectangle, $\{y_i, \epsilon_1\}$, is represented using a vector, $B_i$, with entries that are either 0 or 1. It is built by concatenating representations for each of the b bins for each of the p query dimensions. Each bit in this vector thus corresponds to one of the pb bit-dimensions Consider one of the query dimensions as shown in FIG. 8 (800). Each bin along this dimension corresponds to one bit. The hyperrectangle's interval along this dimension overlaps one or more bins. Bits corresponding to overlapping bins are set to 1, while those for non-overlapping bins are set to 0. FIG. 8 (810) shows the bit vectors (as column vectors) for the four bins along a query dimension. The bit vector representation highlights the redundancy that arises from query partitioning. If the bits for a single item are examined across all bit-dimensions for one stored hyperrectangle (rows in FIG. 8 (810)), they look like $$\underbrace{0000000}_{\substack{\text{item}\\\text{above}\\\text{query}}} \underbrace{111111111111}_{\substack{\text{item}\\\text{overlaps}\\\text{query}}} \underbrace{000000}_{\substack{\text{item}\\\text{below}\\\text{query}}}$$

Thus, the span of the stored hyperrectangle (relative to the bin boundaries) is stored in a redundant binary code. Each interval corresponds to a bit-dimension (columns with boxes around the bits). Only one bit of this binary code (one bit dimension) need be accessed for each query. These bit dimensions are helpful to achieving very fast lookups during retrieval. The bit vectors (columns in FIG. 8 (810)) for all bit dimensions are collected and stored as rows in a bit matrix, D.

The bit matrix has pb columns and M rows. The columns correspond to bit dimensions and the rows correspond to data store items. A nice consequence of using bit indices to represent the hyperrectangle buckets is that set intersection now becomes a linear bitwise intersection of the associated bit strings (e.g., logically AND all the bit strings together). Note that, for the bit matrix D, the transpose can be stored and rows and columns may interchange roles.

Figure 9:
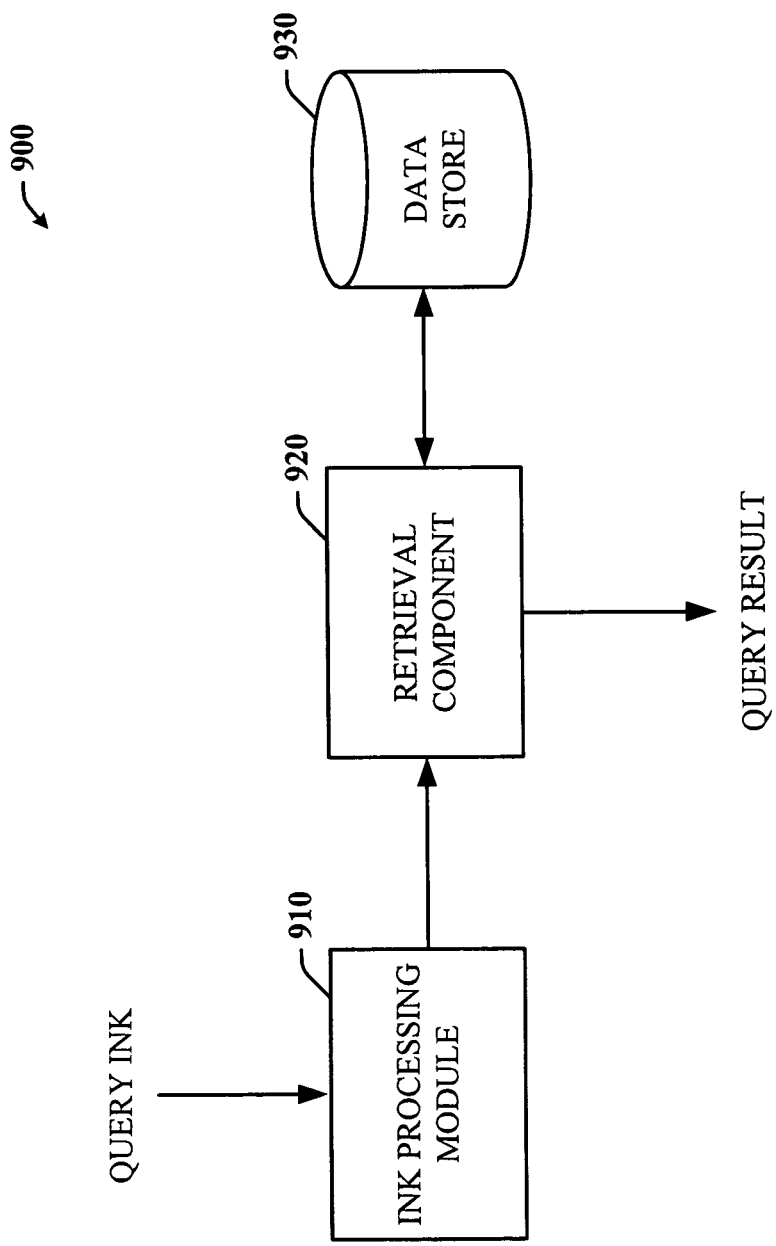
FIG. 9 is a block diagram of an ink retrieval system that can be employed in conjunction with the systems of FIGS. 1 and/or 2, above, to obtain query results based on query ink.

Referring now to the ink retrieval system 900 in FIG. 9, looking up a new handwritten word can be accomplished as follows. First, the query ink (e.g., word) is represented by a procedure similar to processing input ink for storage—via an ink processing module 910:

a) Normalize and segment the word;
b) Classify segments to obtain membership matrix;
c) Project membership matrix along the OPCA dimensions to obtain $y_q$;
d) The projected query point, $y_q$, can be viewed as a hyperrectangle, $\{y_q, \epsilon_q\}$, of zero volume, e.g., $\epsilon_q = 0$;
e) Compute the pb length binary representation, $B_q$, for $\{y_q, \epsilon_q\}$.

Note that only p bits are ON in $B_q$.

A retrieval component 920 can search for all hyperrectangles in the data store 930 that contain the query point $y_q$ which is done by ANDing together the columns of the bit matrix, U, that correspond to non-zero entries in $B_q$. The result is a column bit vector of length M. A quick scan through the column bit vector for non-zero entries produces the query result. Note that these query time linear bitwise operations are very efficient since given a 32-bit CPU with 4-byte registers, set intersection between 2 sets for 32 data items is performed with one CPU operation. A 64-bit processor can process set intersections twice as quickly. Furthermore, most of today's 32-bit CPUs support SIMD extensions (such as MMX and SSE2) that natively allow for up to 128-bit processing. These can further speed up bit operations. Also, given the ordered nature of performing set intersection, excellent memory subsystem performance is achieved. Memory accesses become linear in nature and cache misses are relatively rare, leading to very high bandwidth from the memory subsystem. All these properties cumulatively work to produce an algorithm for set intersection that, while linear in the number of data entries, is extremely efficient.

The indexing and retrieval process described above takes a handwritten query word and returns a collection of data store items. The returned data store items need to be presented in a sorted order with the most similar entries at the top. The presence or absence of relevant entries in the query result (hit list) determines the recall percentage. Given a data store of items, recall is determined by the choice of the number of OPCA dimensions, p, and the number of bits per dimension, b. One way to increase recall is to include extra neighboring intervals (bit-dimensions) during the query process. This can be achieved by:

a) adding one or more neighboring intervals in each dimension and increasing the number of ON bits in $B_q$ (widening the bit vector),
b) ORing together the bit dimensions that correspond to the same projection dimension, and then
c) ANDing together the resulting bit vectors for each projection dimension.

This widening procedure can be iteratively used to gradually increase the matching distance and generate progressively larger hit lists. On the other hand, precision depends not only on the number of relevant items returned in the query result but also the total number of items returned. At design time, precision can be improved by selecting more bit-dimensions, such as by choosing a larger b. At runtime, precision can be improved by sorting the entries in the query result using a similarity metric and then truncating the list to return the top-F best matches. The DTW distance between ink samples can be used to determine similarity. Even though DTW is expensive to compute, it can be used for entries in the query result, which is usually a very small percentage of the whole data store. After sorting, the query result list can be truncated to return the top-1, top-10, or top-100 entries, for example. One can also use a maximum threshold on DTW distance as a means of truncating the query list.

The systems as described above in FIGS. 1-8 were applied to two handwritten word datasets to evaluate the subject ink storage and retrieval system/method. The first dataset is a widely available standard dataset from the UNIPEN. The data set used in our experiments contained all 75,529 isolated cursive and mixed-style handwritten words from category 6. This dataset has 14,002 unique words written by 505 users. The second data set, referred to as US-Natural, is much larger with 898,652 handwritten words corresponding to 10,329 unique words written by 567 US users. It is important to note that both of these datasets are orders of magnitude larger than those used in previous studies on and conventional techniques in indexing and retrieval of digital ink.

Retrieval performance was tested for a) robustness to distortion, b) generalization over a single user's handwriting, and c) generalization across different users. Given the large data store sizes, query input words and query result sets were simply compared using their word labels and user names. Three different degrees of similarity are possible:

a) Most Similar: same word written by the same user;
b) Similar: same word written by different users; and
c) Dissimilar: different words written by same/different users.

Given that words can be written in print or cursive form, degree options a) and b) from above may be considered somewhat interchangeable in their degree of similarity.

Robustness of retrieval performance under writing distortions was tested using the ink distortion model described above with respect to FIGS. 2 and 6 (see FIG. 6 for sample ink distortions). Each sample in the dataset was distorted and used for querying. The noise settings were the same as before, but the distorted samples for testing were different from the ones used for indexing. The rank of the undistorted source sample was used to determine retrieval robustness. Low ranks imply robust indexing. The same distortion settings were used for both datasets.

Every sample in the dataset has a word label and a user label. One of the design criteria for retrieval was that ink retrieval should find not only those samples with very close shape matching, but also should be able to generalize to the same word written by other users. Good generalization performance would indicate that retrieved results would not only contain similar words from the same user but also other users. Each of the datasets was split into two sets based on their (word, user) sample frequencies as follows:

a) First, all (word, user) pairs that occurred only once were dropped from the dataset. This can result in a significant loss in the number of remaining samples (see below).
b) Second, each of the remaining (word, user) sample pairs was split equally between the two sets.

The resulting two sets are of nearly the same size with a near equal distribution of (word, user) samples.

The UNIPEN dataset has very few (word, user) repeats. As a result over 90% of the samples could not be used for generalized tests. The UNIPEN dataset produced two sets with 3,076 and 2,553 samples. The US-Natural dataset resulted in two sets with 515,388 and 383,264 samples. The first set was indexed to build the data store, while entries from the second set were used as query words to determine generalization performance. As in the distortion experiments, the rank of the first query result with the same (word, user) label was used as a measure of generalization performance. Low ranks imply good generalization.

For each of the experiments, three sets of results are presented, namely default, wide-1, and brute force DTW. The retrieval results for brute force DTW are obtained using a linear scan through the data store using DTW distance as the similarity measure. The DTW results present an upper bound on the best possible results if computation time was not a limitation. The default retrieval uses one bit per projection dimension while the wide-1 results are for a widening by one bit: that is, ORing 3 adjacent bit-dimensions together before ANDing across each of the p dimensions. Furthermore, on each plot, retrieval results (ranks) are presented against ink samples from the same user (solid lines) and all users (dashed lines).

Figure 10:
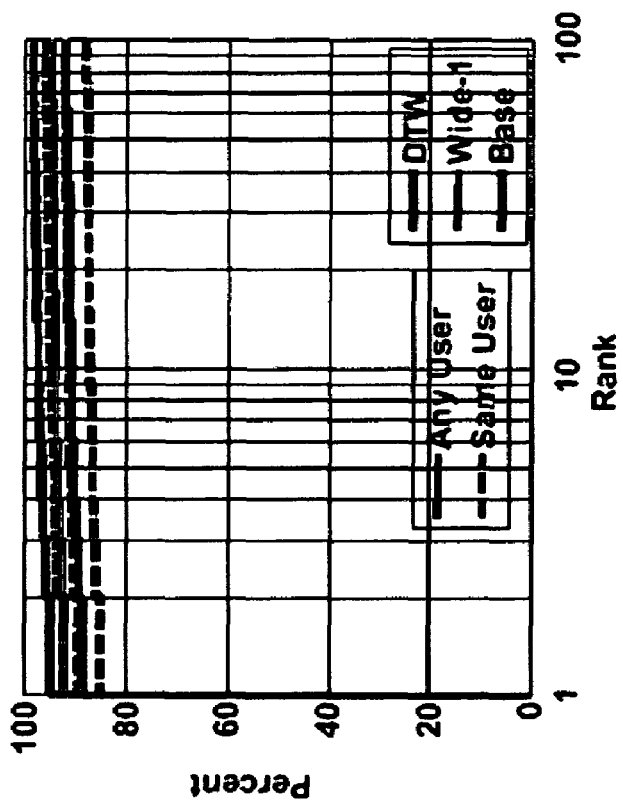
FIG. 10 illustrates a graphical representation of experimental data results obtained when applying the system of FIGS. 1 and/or 2 on a US-Natural dataset.

FIG. 10 presents the distortion results for the US-Natural dataset as a function of the top 100 ranks. In 89% of the queries, the default lookup produces the correct match at rank=1. Widening by 1 bit improves this to 92%. The widened version is 3× slower while processing the bit matrix and on average returned 15% more samples. The DTW results indicate that at best performance is about 95%. Both 89% and 92% results indicate retrieval performance that is robust to input variations. A 2-3% improvement is achieved by extending the match window to the top 10 or 100 ranks.

Figure 11:
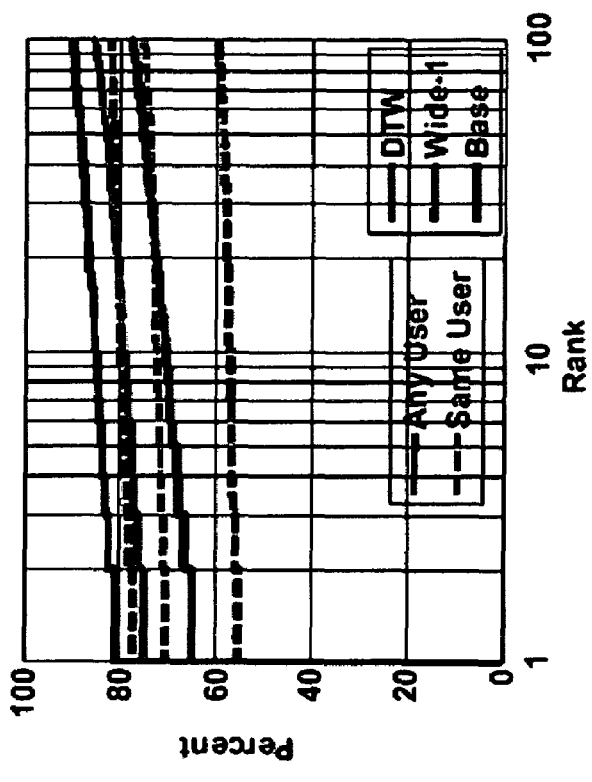
FIG. 11 illustrates a graphical representation of experimental data results obtained when applying the system of FIGS. 1 and/or 2 on a UNIPEN dataset.

FIG. 11 presents corresponding distortion results for the UNIPEN dataset. Retrieval rates under distortion are lower for the UNIPEN dataset with rank=1 accuracies being 63%, 66%, and 75% for default, wide-1, and DTW. The DTW results themselves being lower indicates that multiple instances of the same word in the UNIPEN dataset have larger variations than those in the US-Natural dataset. For both datasets, as would be expected, better results are obtained when matching is relaxed to include not only samples from the same user but all users in the data store. This is clearly indicated by the "All User" retrieval percentages being higher (for the same rank) than the "Same User" percentages.

Figure 12:
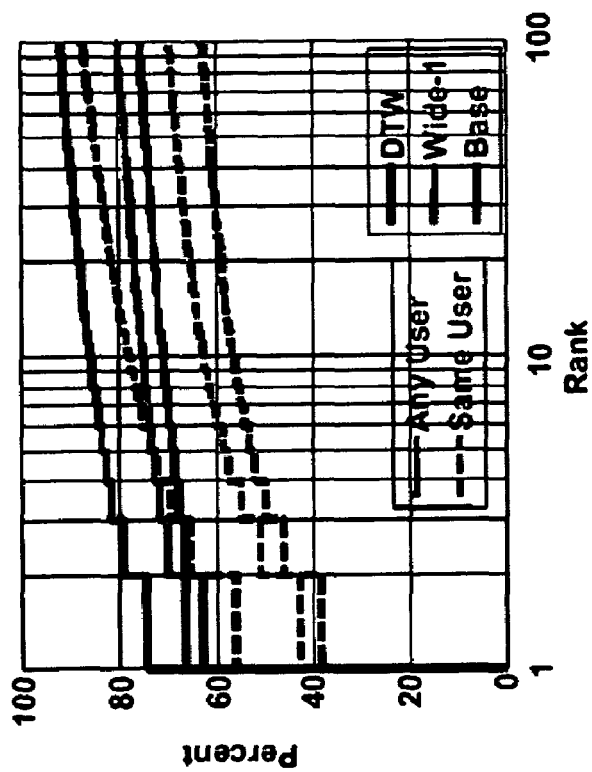
FIG. 12 illustrates a graphical representation of experimental data results obtained when applying the system of FIGS. 1 and/or 2 on a US-Natural dataset.
Figure 13:
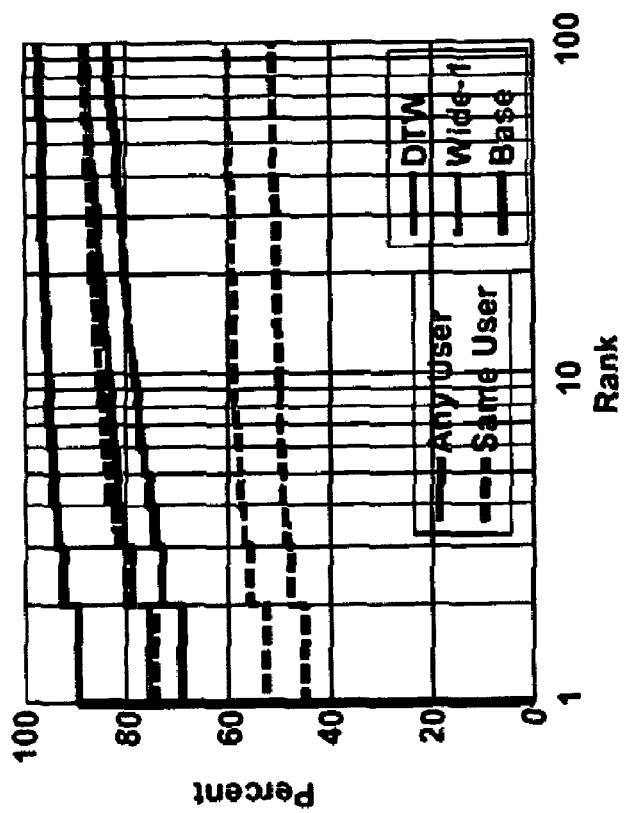
FIG. 13 illustrates a graphical representation of experimental data results obtained when applying the system of FIGS. 1 and/or 2 on a UNIPEN dataset.

FIGS. 12 and 13 present the generalization results for US-Natural and UNIPEN datasets, respectively. Retrieval rates at rank=1 on the US-Natural dataset are 65%, 75%, and 81% for default, wide-1, and DTW, respectively. The corresponding percentages for the UNIPEN dataset are 69%, 76%, and 89% for default, wide-1, and DTW, respectively. Retrieval percentages grow by 4% for US-Natural and 7% for UNIPEN when the top 10 retrieved ink words are examined. As with the distortion results, the generalization results are better when matching is relaxed to include samples from all users.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 14:
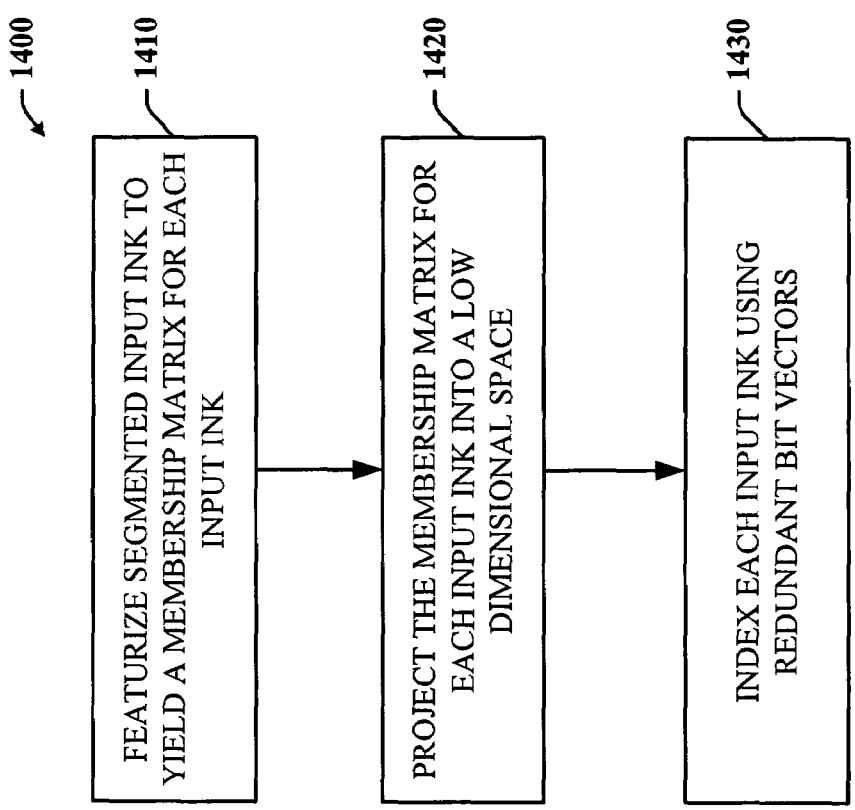
FIG. 14 is a flow diagram illustrating an exemplary methodology that facilitates indexing and retrieval of electronic ink using redundant bit vectors.

Turning now to FIG. 14, there is a flow diagram of an exemplary method 1400 that facilitates indexing electronic ink using redundant bit vectors, thereby improving the speed, accuracy, and overall efficiency of ink retrieval. The method 1400 involves featurizing the input ink in order to create a membership matrix for the input ink (e.g., handwritten word) at 1410. The input ink can be normalized and segmented prior to the featurization. Thus, each segment can be featurized and classified by a neural network.

Following, the membership matrix (for each input ink or ink word) can be projected into a low dimensional space at 1420 according to selected projection directions. OPCA can be employed to find the projection directions for the particular membership matrix that maximize signal variance and minimize noise variance. The low dimensional space can be defined by at least a subset of OPCA projection directions. The membership matrix (or matrices) can be converted to at least one vector and enclosed by a hyperrectangle. The hyperrectangle for each input ink can be stored using redundant bit vectors in one or more data stores at 1430. These redundant bit vectors can be stored in RAM or on disk, as is known in the art. The bit vectors can also be stored in one (or more) database(s), as long as the database can perform the steps in FIG. 16, below. Those steps can be executed, for example, with stored procedures. Alternatively, the bit vectors can be permanently stored in a database, but operated on in RAM.

Figure 15:
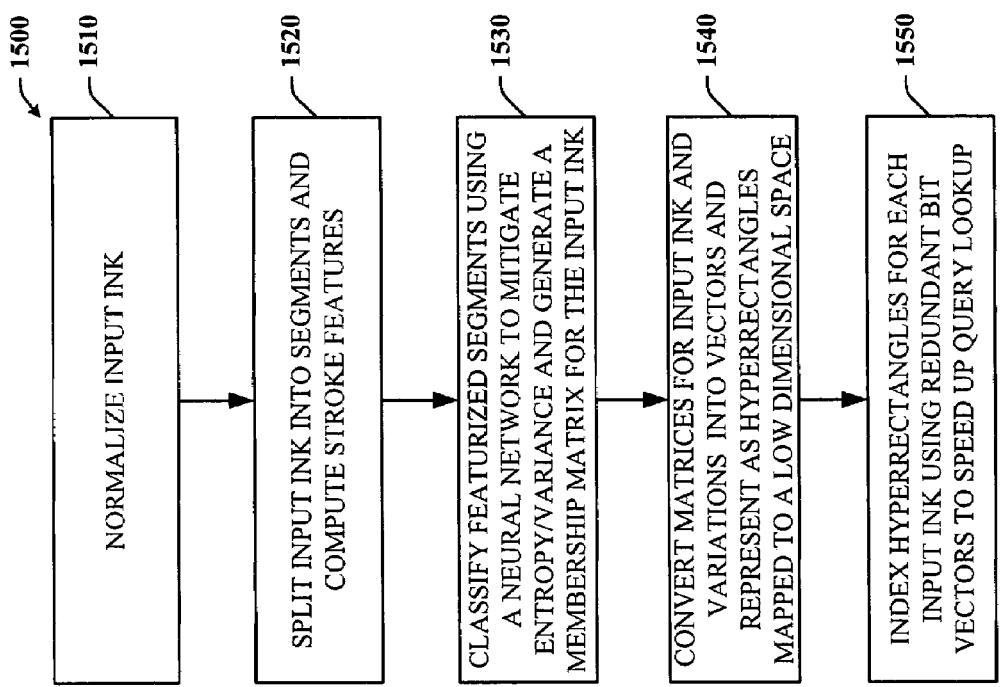
FIG. 15 is a flow diagram illustrating an exemplary methodology that facilitates indexing and retrieval of electronic ink using redundant bit vectors.

The flow diagram in FIG. 15 presents some additional detail regarding a method 1500 that facilitates ink indexing for efficient and accurate retrieval. In particular, the method 1500 involves normalizing input ink at 1510. The normalization process can include smoothing, centering, and scaling the input ink to a unit height while maintaining the aspect ratio. Some or all aspects of the normalization process may not be needed since many pen-based or ink-based device drivers automatically smooth and sub-sample pen input points to remove quantization and other spurious noise.

At 1520, the input ink can be cut into segments and featurized. More specifically, a cut point is determined by a y coordinate at its minimum value and where it begins to increase. As discussed earlier, each segment can be represented in the form of a Chebyshev polynomial. The coefficients of the truncated polynomials can become the segment features, which are invertible and can contribute to a reconstruction of the approximate versions of the source segments. At 1530, the featurized segments can be classified using a neural network which can be used to generate a membership matrix for the input ink. Segment classification can significantly reduce or mitigate entropy in stroke features, thus leading to improved retrieval accuracy.

Handwriting has a greater amount of variation compared to other multimedia data. This is even true when dealing with the same word written multiple times by the same user whether in print or in cursive. Using an ink distortion model, a plurality of distorted versions of the input ink can be created and used during indexing. In order to make the subject system and method robust to such variations, low dimensional representations of the input ink can be built. This can be accomplished in part by mapping the membership matrix for the input ink to a low dimensional space. In particular, the membership matrix can be converted into a vector, represented as an enclosed hyperrectangle, and projected into the low dimensional space according to at least a subset of OPCA projection directions (at 1540). Membership matrices for the distorted versions of the input ink can be mapped to the low dimensional space as well. At 1550, the hyperrectangles for each input ink can be indexed in a data store using redundant bit vectors which facilitates speeding up the query look-up process.

Figure 16:
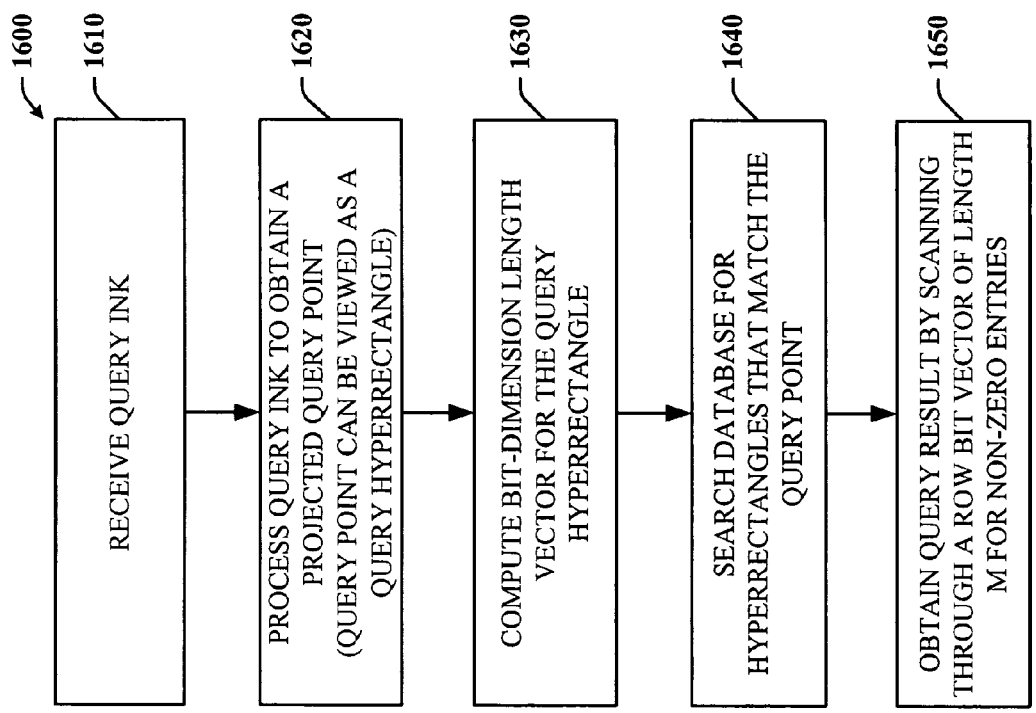
FIG. 16 is a flow diagram illustrating an exemplary methodology that facilitates retrieving electronic ink from data store(s) in which the ink has been indexed using redundant bit vectors.

Referring now to FIG. 16, there is a flow diagram of an exemplary ink retrieval method 1600. The method 1600 involves receiving a query ink 1610. For example, imagine that a user has stored multiple ink documents relating to notes, reports, and project updates on his ink-based computing device (e.g., tablet PC, PDA, desktop computer, mini laptop or PC, etc.). To access at least one stored ink document concerning a mobility study, the user enters a query (in ink as well) for mobility (query ink). The query ink can be processed at 1620 in a manner similar to the ink indexing scheme in order to obtain a projected query point ($y_p$). Recall that the query point can be viewed or represented as a hyperrectangle (query hyperrectangle). At 1630, the bit-dimension length vector for the query hyperrectangle can be computed. That is, the vector is of length bp, the number of bit-dimensions that were pre-computed. Thereafter, the data store can be searched in order to find at least one match between the query hyperrectangle and the query point. The query result can be obtained by scanning through a row bit vector of length M for non-zero entries at 1650. Thus, any matches found in the data store can be presented to the user. For example, the user may be presented with a list of ink documents that all contain at least one instance of the ink word mobility.

Using bit vectors makes the computations very efficient. This is because the data store lookup operations boil down to ANDing and ORing operations on large contiguous blocks of bits. Such operations can be very efficiently performed on the ever-advancing digital computing device.

Moreover, the subject systems and methods facilitate indexing and retrieval of handwritten words (cursive or print) obtained using an electronic writing device. The handwritten words are first mapped to a low dimension through a process of segmentation, stroke classification using a neural network, and projection along directions found using oriented principal component analysis (OPCA). Using OPCA makes these low dimensional representations robust to handwriting variations (noise). Each handwritten word is stored along with a neighboring hyperrectangle that represents word variations. Redundant bit vectors are used to index the resulting hyperrectangles for efficient storage and retrieval, as they are ideal for quickly performing lookups based on point and hyperrectangle hit-tests. Furthermore, the recall and precision values obtained can be varied by changing the number of projections (p) used and the number of quantized levels along each projection (b).

Figure 17:
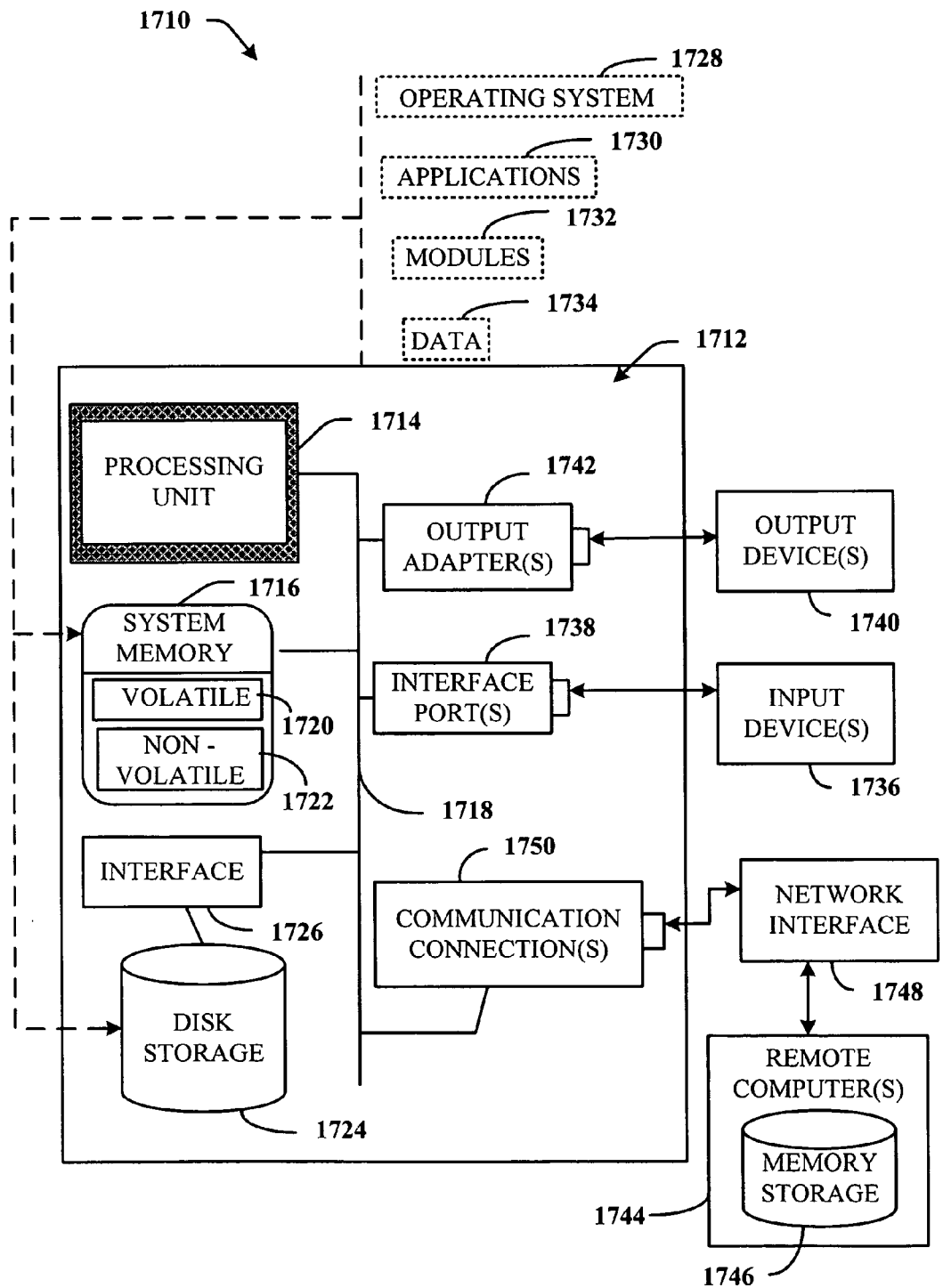
FIG. 17 illustrates an exemplary environment for implementing various aspects of the invention.

In order to provide additional context for various aspects of the subject invention, FIG. 17 and the following discussion are intended to provide a brief, general description of a suitable operating environment 1710 in which various aspects of the subject invention may be implemented. In particular, the subject indexing and retrieval systems and methods can exist or operate on both portable and non-portable devices that support ink-based input (via pen, stylus or other inking input device).

While the invention is described in the general context of computer-executable instructions, such as different modules or components, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1710 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 17, an exemplary environment 1710 for implementing various aspects of the invention includes a computer 1712. The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Dual microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable ROM (EEPROM), or flash memory. Volatile memory 1720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/nonremovable, volatile/nonvolatile computer storage media. FIG. 17 illustrates, for example a disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to the system bus 1718, a removable or non-removable interface is typically used such as interface 1726.

It is to be appreciated that FIG. 17 describes software that acts as an intermediary between users and the basic computer resources described in suitable operating environment 1710. Such software includes an operating system 1728. Operating system 1728, which can be stored on disk storage 1724, acts to control and allocate resources of the computer system 1712. System applications 1730 take advantage of the management of resources by operating system 1728 through program modules 1732 and program data 1734 stored either in system memory 1716 or on disk storage 1724. It is to be appreciated that the subject invention can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712 and to output information from computer 1712 to an output device 1740. Output adapter 1742 is provided to illustrate that there are some output devices 1740 like monitors, speakers, and printers among other output devices 1740 that require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates indexing and retrieving electronic handwritten ink characters comprising:
    an ink processing module to:
        featurize input ink to yield a membership matrix for each input ink,
        project at least the membership matrix for each input ink into a low dimensional space, and
        determine a projected query point for the query ink, wherein the query point is represented as a query hyperrectangle; and
    a retrieval module to:
        search a data store for hyperrectangles that intersect the query point to produce query results, and
        widen the query results by adding one or more neighboring intervals in each dimension and increasing a number of ON bits in a binary representation of the query hyperrectangle.

2. The system of claim 1, wherein the input ink comprises at least one of the following: a word, one or more characters, or one or more symbols.

3. The system of claim 1 further comprises a normalization component that smoothes and scales the input ink to a unit height while maintaining its aspect ratio to make retrieval of the input ink indifferent to translation and scale variations.

4. The system of claim 1 further comprises a segmentation component that segments each input ink into a plurality of segments by culling the input ink where a y-coordinate value of the input ink reaches a minimum value and starts to increase.

5. The system of claim 1, wherein the ink processing module projects the membership matrix for each input ink into the low dimensional space in a plurality of projection directions defined by at least one of the following: oriented principal component analysis (OPCA) and multiple discriminant analysis (MDA).

6. The system of claim 1, wherein the ink processing module maps the segmented input ink to the membership matrix using a neural network before projecting it into the low dimensional space.

7. The system of claim 1, wherein the ink processing module creates low dimensional representations of the membership matrix for a given input ink to facilitate ink retrieval that is robust to user and instance variations.

8. The system of claim 1, wherein the ink processing computes a binary representation for the query hyperrectangle.

9. The system of claim 1, wherein the retrieval component widens the query results by ORing together bit dimensions that correspond to a same projection dimension.

10. The system of claim 1, wherein the retrieval component widens the query results by:
    ORing together bit dimensions that correspond to a same projection dimension; and ANDing together any resulting bit vectors for each projection dimension.

11. The system of claim 1, wherein the retrieval component optimizes precision of the query results by ranking the query results using a similarity metric and truncating the query results to return the top-F best matches.

12. An ink indexing and retrieval method that facilitates retrieving electronic handwritten ink objects comprising:
receiving an input ink;
featurizing the input ink to yield a membership matrix for each input ink;
projecting the membership matrix, via a processor component, for each input ink into a low dimensional space;
determining a projected query point for the query ink, wherein the query point is represented as a query hyperrectangle;
computing a binary representation for the query hyperrectangle;
indexing each input ink using redundant bit vectors to build a data store;
searching the data store for hyperrectangles that intersect the guery point to produce query results;
widening the query results comprising:
adding one or more neighboring intervals in each dimension and increasing a number of ON bits in the computed binary representation for the query hyperrectangle to widen a bit vector,
ORing together bit dimensions that correspond to a same projection dimension, and
ANDing together any resulting bit vectors for each projection dimension.

13. The method of claim 12, wherein featurizing the input ink comprises:
splitting the input ink into a plurality of segments;
determining segments features based on the plurality of segments; and
classifying the stroke features to mitigate entropy and variance to create a membership matrix for the input ink.

14. The method of claim 13 further comprises creating a plurality of distorted versions of the input ink and creating membership matrices for the distorted versions.

15. The method of claim 14 further comprises mapping the membership matrices for the distorted versions of the input ink onto the low dimensional space.

16. The method of claim 12, wherein the low dimensional space is defined by at least a subset of projection directions.

17. The method of claim 16 further comprises using at least one of OPCA and MDA to determine the projection directions.

18. A system that facilitates indexing and retrieving electronic handwritten ink characters comprising:
a processor; and
a memory into which a plurality of computer-executable instructions are loaded, the plurality of instructions performing a method comprising:
featurizing input ink to yield a membership matrix for each input ink;
projecting at least the membership matrix for each input ink into a low dimensional space;
indexing each input ink using redundant bit vectors;
processing a query ink to yield a query hyperrectangle and searching one or more bit vector indices for hyperrectangles that at least closely match the query ink; and
widening the searching by increasing a number of ON bits in a binary representation of the query hyperrectangle.

* * * * *

UNITED STATES PATENT AND TRADEMARK OFFICE
CERTIFICATE OF CORRECTION

PATENT NO. : 7,646,940 B2
APPLICATION NO. : 11/397436
DATED : January 12, 2010
INVENTOR(S) : Kumar H. Chellapilla et al.

It is certified that error appears in the above-identified patent and that said Letters Patent is hereby corrected as shown below:

In column 5, line 11, delete "culling" and insert -- cutting --, therefor.

In column 9, line 27, delete "U" and insert -- D --, therefor.

In column 16, line 41, in Claim 4, delete "culling" and insert -- cutting --, therefor.

In column 17, line 20, in Claim 12, delete "guery" and insert -- query --, therefor.

Signed and Sealed this
Thirty-first Day of May, 2011

David J. Kappos
*Director of the United States Patent and Trademark Office*